US008644632B2

(12) United States Patent
Joshi et al.

(10) Patent No.: US 8,644,632 B2
(45) Date of Patent: Feb. 4, 2014

(54) ENHANCING IMAGE QUALITY (75) Inventors: Rajan Laxman Joshi, Glendale, CA (US); James Arthur Fancher, Marina Del Rey, CA (US); Ana Belen Benitez, Los Angeles, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 375 days.

(21) Appl. No.: 12/451,939

(22) PCT Filed: Jun. 27, 2007

(86) PCT No.: PCT/US2007/014961
§ 371 (c)(1),
(2), (4) Date: Feb. 19, 2010

(87) PCT Pub. No.: WO2009/002313
PCT Pub. Date: Dec. 31, 2008

(65) Prior Publication Data
US 2010/0142836 A1    Jun. 10, 2010

(51) Int. Cl.
*G06K 9/36* (2006.01)
(52) U.S. Cl.
USPC ........... 382/240; 382/232; 382/233; 382/248; 382/250
(58) Field of Classification Search
USPC ............... 382/100, 232–253, 276, 284, 289; 375/40.01, 240.03, E7.14; 348/403, 348/420; 341/51
See application file for complete search history.

(56) References Cited

U.S. PATENT DOCUMENTS

| 5,621,660 | A | 4/1997 | Chaddha |
| 5,768,535 | A | 6/1998 | Chaddha et al. |
| 6,937,772 | B2 * | 8/2005 | Gindele ......................... 382/240 |
| 7,133,567 | B2 * | 11/2006 | Ohyama et al. ............... 382/246 |

(Continued)

FOREIGN PATENT DOCUMENTS

| EP | 1816870 | 8/2007 |
| JP | 09163362 | 6/1997 |

(Continued)

OTHER PUBLICATIONS

Bilgin et al., JPEG2000 for Digital Cinema, DTS, Agoura Hills, CA, available at least by Mar. 20, 2007, 4 pages.*

(Continued)

*Primary Examiner* — Mekonen Bekele
(74) *Attorney, Agent, or Firm* — Robert D. Shedd; Brian J. Dorini (57) ABSTRACT

At least one particular method and apparatus provide an enhanced quality low resolution image extracted from a scalable high resolution bit stream in a DCP bit stream. In various implementations, an enhancement layer is used to produce the enhanced low resolution image. The enhancement layer may include, for example, spatial-domain or frequency-domain information to be used to enhance the typical low resolution image extracted from a DCP bit stream. One specific process includes encoding a digital image into an encoded image. The encoded image is capable of being processed to provide a higher resolution decoding of the digital image and to provide a lower resolution decoding of the digital image. The process further includes encoding additional information for enhancing the lower resolution decoding to provide an enhanced lower resolution image. A complimentary signal and decoding process are also provided, as well as structures for performing the processes.

20 Claims, 7 Drawing Sheets

(56) References Cited

U.S. PATENT DOCUMENTS

| | | | |
|---|---|---|---|
| 7,200,277 B2* | 4/2007 | Joshi et al. | 382/248 |
| 7,221,804 B2* | 5/2007 | Atsumi et al. | 382/239 |
| 7,400,653 B2* | 7/2008 | Davies et al. | 370/493 |
| 7,463,683 B2* | 12/2008 | Van Der Schaar et al. | 375/240.1 |
| 7,697,771 B2* | 4/2010 | Atsumi et al. | 382/239 |
| 7,791,649 B2* | 9/2010 | Kim et al. | 348/223.1 |
| 7,889,937 B2* | 2/2011 | Kirenko | 382/240 |
| 8,170,334 B2* | 5/2012 | Balster et al. | 382/166 |
| 2004/0032968 A1 | 2/2004 | Andrew et al. | |
| 2005/0117475 A1* | 6/2005 | Abe et al. | 369/47.15 |
| 2005/0201459 A1* | 9/2005 | Hayashi | 375/240.2 |
| 2006/0290957 A1* | 12/2006 | Kim et al. | 358/1.9 |
| 2007/0237409 A1* | 10/2007 | Atsumi et al. | 382/239 |
| 2007/0273798 A1* | 11/2007 | Silverstein et al. | 348/752 |
| 2008/0043835 A1 | 2/2008 | Sasai et al. | |
| 2008/0095450 A1* | 4/2008 | Kirenko | 382/232 |
| 2009/0172028 A1* | 7/2009 | Benitez et al. | 707/104.1 |
| 2009/0185684 A1* | 7/2009 | Antonellis et al. | 380/210 |
| 2009/0226030 A1* | 9/2009 | Picard et al. | 382/100 |

FOREIGN PATENT DOCUMENTS

| | | |
|---|---|---|
| JP | 2006197074 | 7/2006 |
| JP | 200713706 | 1/2007 |
| WO | WO0147277 | 6/2001 |
| WO | WO2006054507 | 5/2006 |
| WO | WO2006058921 | 6/2006 |

OTHER PUBLICATIONS

Yea et al, ,"On Scalable Lossless Video Coding Based on Sub-Pixel Accurate MCTF", published in Jan. 2006.*

John Miano "compressed image file format" book, pp. 6 and 43, third edition 2005.*

Christopoulos et al., "The JPEG2000 Still Image Coding System: An Overview," Aug. 30, 2000, pp. 1103-1127.

Digital Cinema Initiatives, "Digital Cinema System Specification V1.0," DCI Digital Cinema System Spec v1.0a, Jul. 20, 2005, pp. i-162.

IP-Racine and IST, "D3.2.1 Metadata in the Digital Cinema Workflow and its Standards Report v1," IST-2-511316-ip, Oct. 1, 2004, pp. 1-38.

Li et al., "Overview of Fine Granularity Scalability in MPEG-4 Video Standard," IEEE Transactions on Circuits and Systems for Video Technology, vol. 11, No. 3, Mar. 2001, pp. 301-317.

Marcellin et al., "JPEG2000 for Digital Cinema," SMPTE Motion Imaging Journal, May/Jun. 2005, pp. 202-209.

OHM et al, "Interframe wavelet coding—motion picture representation for universal scalability," Signal Processing Image Communication, Elsevier Science Publishers, Amsterdam, NL, vol. 19, No. 9, Oct. 2004, pp. 877-908.

Richards, "MPEG vs. JPEG 2000," available at least by Mar. 20, 2007, 3 pages.

International Search Report, dated May 8, 2008.

Digital Cinema Initiatives, LLC. "Digital Cinema System Specification", Version 1.1, Apr. 12, 2007.

* cited by examiner

ENHANCING IMAGE QUALITY

This application is a National Stage Application and claims the benefit, under 35 U.S.C. §365 of International Application PCT/US2007/014961 filed Jun. 27, 2007 which was published in accordance with PCT Article 21(2) on Dec. 31, 2008 in English.

BACKGROUND

1. Technical Field

The present principles relate to image processing. More particularly, at least one implementation relates to resolution scalability for imaging systems.

2. Description of the Prior Art

Resolution scalability is a feature in a number of imaging systems. The term "imaging system" is used to encompass systems which process and render still images as well as moving images or videos. Many of the known imaging systems provide access to a video frame at different resolutions. For example, in 4K workflows for Digital Cinema (DC) or Digital Intermediates (DI), lower resolution versions (proxies) of the 4K resolution images are available. The video frames are stored in a compressed format, and a lower resolution version of the video frame (in compressed format) can be obtained from the higher resolution compressed code-stream by simple truncation or parsing. The term parsing is used in the sense of accessing non-contiguous parts of the compressed code-stream without performing decompression. In the absence of resolution scalability, to obtain a lower resolution, a system may decode the high resolution video frame and perform downscaling to the lower resolution. Downscaling allows system providers to use different algorithms for downscaling.

SUMMARY

According to one general aspect, a digital image is encoded into an encoded image. The encoded image is capable of being processed to provide a higher resolution decoding of the digital image and to provide a lower resolution decoding of the digital image. Additional information is encoded for enhancing the lower resolution decoding to provide an enhanced lower resolution image.

According to another general aspect, encoded image data is accessed. The accessed encoded image data is capable of being processed to provide a higher resolution decoding of an image and to provide a lower resolution decoding of the image. Additional encoded information is accessed for enhancing the lower resolution decoding of the image to provide an enhanced lower resolution image.

According to another general aspect, an apparatus includes a processor that is configured to receive encoded image data and additional encoded data. The apparatus includes a high resolution processing group, coupled to the processor, configured to generate low resolution extracted image data from high resolution compressed image data contained within the encoded image data. The apparatus also includes a low resolution processing group, coupled to the processor, configured to generate an enhanced low resolution image using (a) the low resolution extracted image data and (b) the additional encoded data.

According to another general aspect, a signal representing information includes a first signal and a second signal portion. The first signal portion represents encoded data for an encoded image, the encoded data capable of being processed to produce a higher resolution decoding of the encoded image and to produce a lower resolution decoding of the encoded image. The second signal portion represents additional encoded information for enhancing the lower resolution decoding.

The details of one or more implementations are set forth in the accompanying drawings and the description below. Even if described in one particular manner, it should be clear that implementations may be configured or embodied in various manners. For example, an implementation may be performed as a method, or embodied as an apparatus configured to perform a set of operations or an apparatus storing instructions for performing a set of operations. Other aspects and features will become apparent from the following detailed description considered in conjunction with the accompanying drawings and the claims.

BRIEF DESCRIPTION OF THE DRAWINGS

In the drawings like reference numerals generally denote similar components throughout the views.

DETAILED DESCRIPTION

In the case of resolution scalability, the compression method and file format used may place restrictions on the lower resolution image. As an example, the Digital Cinema Initiative (DCI) specification V1.0, July 2005, issued by Digital Cinema Initiatives, LLC, mandates that a 2K version should be contained in a 4K version and be accessible by simple truncation. However, this means that the downscaling filter is restricted to be the 9-tap low-pass filter used by JPEG2000. If a 2K projector has to use the 2K extracted code-stream to reconstruct the 2K resolution video, it may be placed at a disadvantage compared to 2K projectors which have access to 2K compressed material which was produced by first downscaling the 4K resolution video and then compressing the downscaled 2K version. However, performing the downscaling operation is typically computationally complex. It would be desirable to provide a method to enhance the quality of a low resolution image extracted from a scalable high resolution code-stream.

Enhancement layers are commonly used to provide quality scalability. An example of this is MPEG-4 Fine Grain Scalability in the MPEG-4 video standard. Typically, the purpose of the enhancement layer is to produce a reconstructed image that is closer to the original image.

However, in at least one implementation, an enhancement layer is used to produce a reconstructed image that is closer to a downscaled version of the original image—and not necessarily closer to the original image itself. The inventors have recognized that such a counter-intuitive operation provides for technical advantages such as improved quality within the context of, for example, a DCI-like system or standard. A DCI-like standard may be defined as a standard that provides a compressed code-stream from which both a higher-resolution compressed bitstream and a lower-resolution compressed bitstream can be extracted before decompressing the compressed code-stream.

The enhancement layer implementation referred to above also uses different coding processes to produce the original encoding (layer) and the additional (enhancement) encoding (layer). This is different from systems that use a common algorithm to gradually create and send more granular information for the iterative encoding of a given image. In such systems, each of the successive encodings (layers) is related to each other. An example is a system that sends, in each layer, increasingly fine quantizations of DCT (discrete cosine transform) coefficients. However, the enhancement layer implementation referred to above uses two separate and independent encoding processes, as well as starts with different images.

At least one implementation provides a method for increasing or enhancing the quality of a low resolution image extracted from the scalable high resolution code-stream. In accordance with an implementation, the downscaling method of the present principles utilizes an enhancement layer to produce an enhanced low resolution image by directly operating on the high resolution image. An implementation of the present principles is now described with reference to Digital Cinema System Specification V1.0, July 2005 issued by Digital Cinema Initiatives, LLC.

By way of example, the high resolution image is a 4K (4096×2160) image and the low resolution image is a 2K image (2048×1080). Consider an original 4K image that is encoded according to the DCI specification using JPEG2000 to produce a DCI compliant 4K compressed code-stream. Those of skill in the art will recognize that the terminology used herein is from the JPEG2000 standard.

If the 4K compressed code-stream is fed to a 2K decoder, the decoder extracts a compressed code-stream corresponding to the 2K resolution and then decodes it to produce a 2K resolution extracted image. However, this 2K resolution image is constrained to be the compressed version of the LL band (as known, the LL band is low frequency in both the horizontal and vertical directions) at the next lower resolution from the resolution hierarchy produced by the wavelet transform used in JPEG2000. As mentioned above, this may not be the best choice for a downscaling operation. For example, a downscaling method may be able to use a much better filter and adaptive processing to produce an improved or enhanced 2K image. Thus, if the projector is a 2K projector having a 2K decoder, it may be better to perform the downscaling operation on the higher resolution 4K original image to produce the downscaled 2K image. Then, the 2K image can be compressed at the maximum rate allowed by the DCI specification to produce a 2K distribution which is fed to the 2K projector. However, there is a desire to have a single inventory on the sender (e.g. studio) side to reduce costs. The single inventory being the 4K distribution. This compares to having to provide in inventory the 4K distribution as well as the improved or enhanced 2K image. In the case of a single inventory, the 2K projectors may be disadvantaged.

Figure 1:
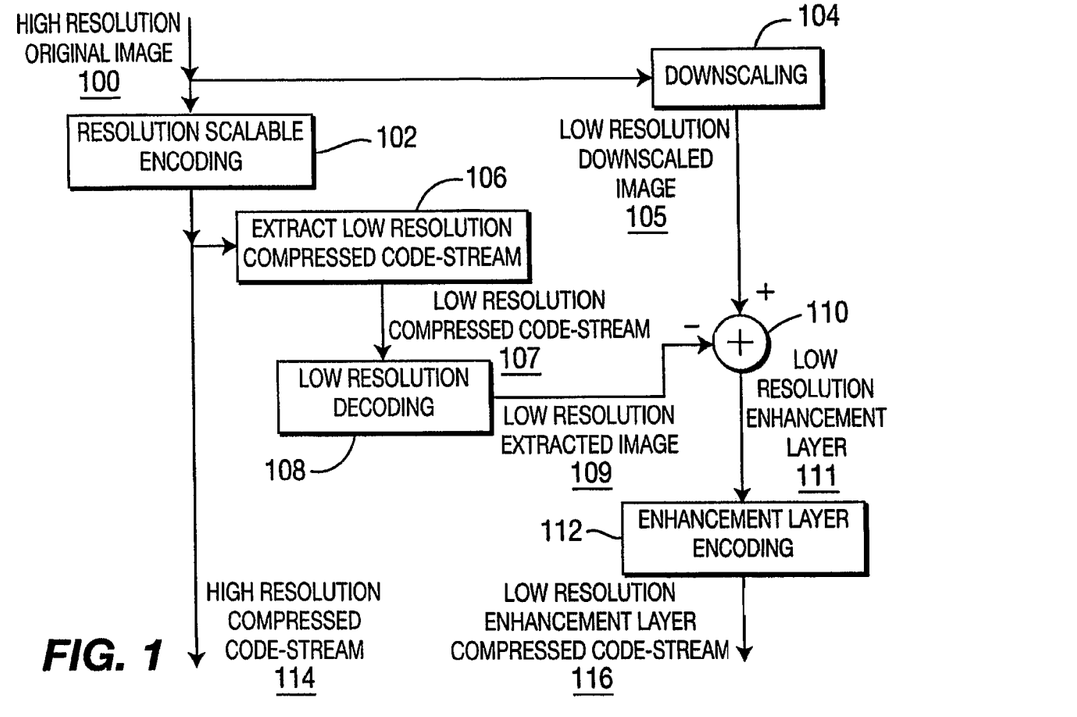
FIG. 1 is a flow diagram of a method for creating a low resolution enhancement layer to be used in conjunction with a resolution scalable encoding of a high resolution image.

One way to reduce this disadvantage is through an implementation of the present principles. FIG. 1 shows one implementation of creating a low resolution enhancement layer to be used in conjunction with a resolution scalable encoding of a high resolution image to produce an enhanced low resolution image.

A high resolution original image 100 (i.e., 4K image) is accessed and undergoes resolution scalable encoding 102 to produce a high resolution compressed code-stream 114. "Accessing" is a broad term, including, for example, obtaining, retrieving, receiving, manipulating, or processing in various manners. The terms "encoding" and "compression", are used herein interchangeably.

For example, the DCI Spec (JPEG2000) encoding essentially comprises DC level-shifting, inter-component transform, wavelet transform, quantization, and entropy coding. As mentioned earlier, the high resolution original image 100 also undergoes downscaling 104 to produce a low resolution downscaled image 105. The downscaling could be any desired downscaling operation, including a proprietary operation, to produce a downscaled image having a desired quality or a desired characteristic.

A low resolution compressed code-stream 107 is extracted (106) from the high resolution compressed code-stream 114, and the low resolution compressed code-stream 107 undergoes low resolution decoding 108 to produce a low resolution extracted image 109. Taking the difference (110) between the low resolution downscaled image 105 and the low resolution extracted image 109 produces a low resolution enhancement layer 111. The enhancement layer 111 is encoded 112 to produce a low resolution enhancement layer compressed code-stream 116.

Note that, more generally, the implementation produces additional information 111. This additional information 111 is, in a particular implementation of FIG. 1, referred to as the enhancement layer 111. In various implementations the additional information is exactly the same as an enhancement layer. In other implementations the additional information is not referred to as an enhancement layer until after the additional information is formatted into a particular format of an enhancement layer.

Those skilled in the art will recognize that it is possible to encode the low resolution enhancement layer at any quality, including lossless. This affects the size of the low resolution layer compressed code-stream 116. In at least one implementation, the size of the enhancement layer compressed code-stream 116 may not exceed a fixed number of bytes. The byte limit may be determined, for example, based on user input.

Figure 2:
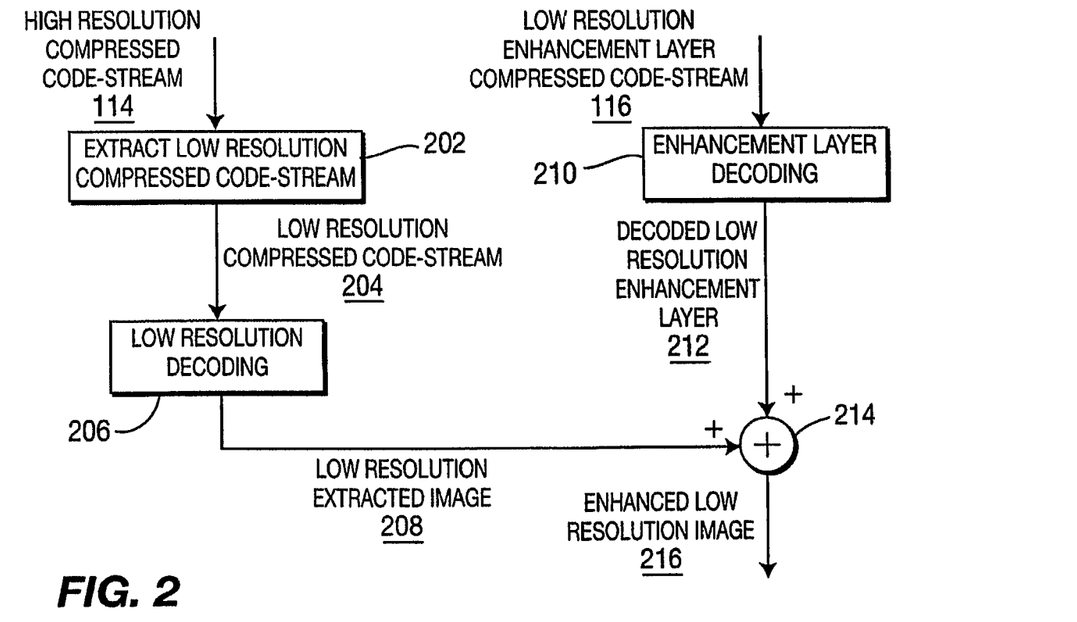
FIG. 2 is a flow diagram of a method for creating an enhanced low resolution image using the created low resolution enhancement layer of FIG. 1.

FIG. 2 shows how a low resolution enhancement layer compressed code-stream 116 can be combined with a corresponding high resolution compressed code-stream 114 to produce an enhanced low resolution image. A low resolution compressed code-stream 204 is extracted 202 from the high resolution compressed code-stream 114. The low resolution compressed code-stream 204 is then low resolution decoded 206 to obtain a low resolution extracted image 208 (expected to be the same as image 109). Meanwhile, a low resolution enhancement layer 212 is produced by decoding (210) the low resolution enhancement layer compressed code-stream 116. The decoded low resolution enhancement layer 212 is added 214 to the low resolution extracted image 208 to produce an enhanced low resolution image 216. The enhanced low resolution image 216 is expected to be the same as the low resolution downscaled image 105 if lossless encoding is used to encode the low resolution enhancement layer (112).

Those skilled in the art will also recognize that it is possible to create multiple low resolution enhancement layers, each corresponding to a different resolution. As an example, you could have a 2K enhancement layer and another 1K enhancement layer. Each layer, when combined with the corresponding extracted resolution would create an enhanced image at that lower resolution.

Figure 7:
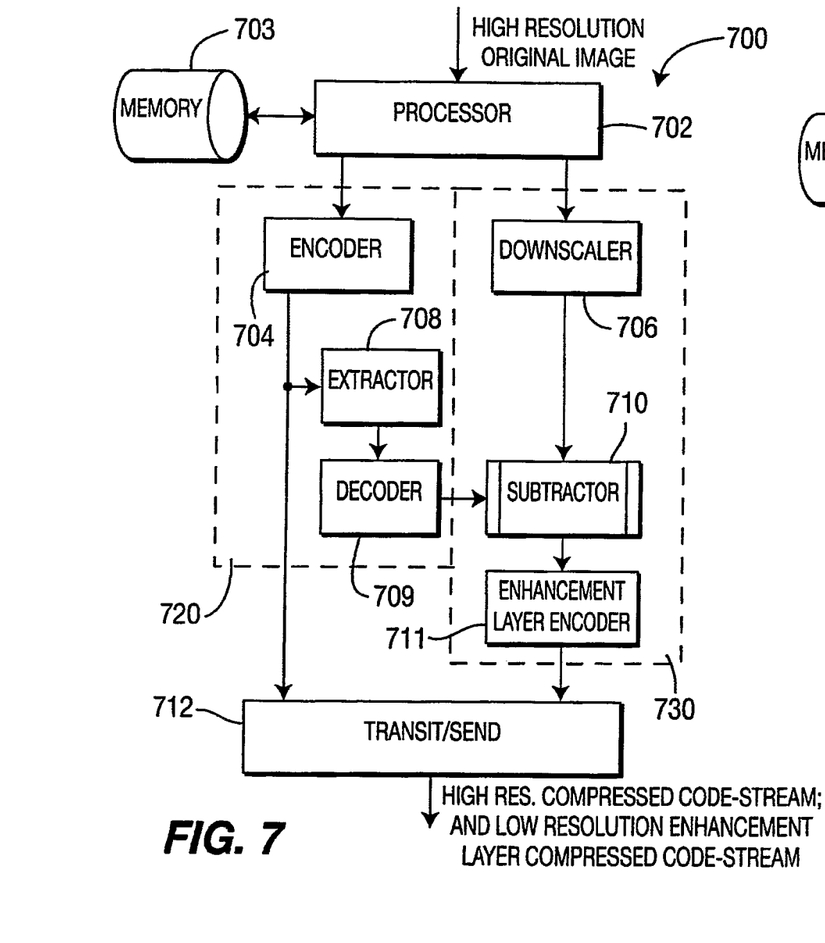
FIG. 7 is a block diagram of an encoder for producing a low resolution enhancement layer.
Figure 8:
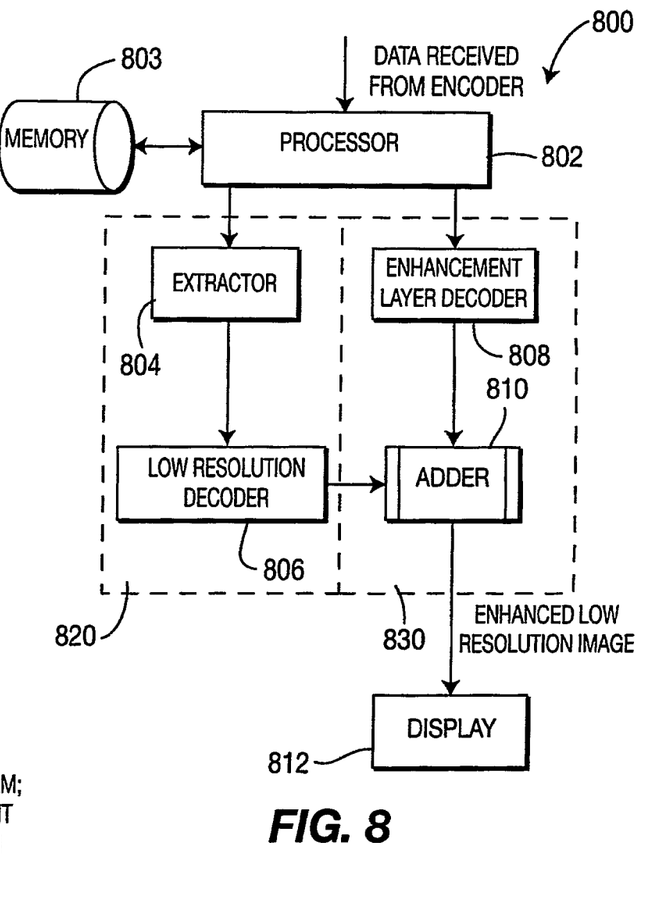
FIG. 8 is a block diagram of a decoder for producing an enhanced low resolution image.

FIGS. 7 and 8 show block diagrams of an encoder 700 and decoder 800 according to the implementation shown in FIGS. 1 and 2, respectively. The encoder 700 includes a processor 702 configured to receive high resolution original image data, a memory 703 in communication with the processor and a high resolution processing group 720 and low resolution processing group 730.

The processor 702 is directly coupled to the memory 703, the encoder 704, and the downscaler 706. The processor 702 is indirectly coupled to the extractor 708, the decoder 709, and other units within the encoder 700. As should be clear, the term "coupled" refers to both direct (no intervening units) and indirect (intervening units) connections, and such connections may be, for example, wired or wireless, and permanent or transient.

The processor 702 sends the high resolution image data to both the high resolution processing group 720 and the low resolution processing group 730. The high resolution processing group 720 inputs the high resolution original image data to a resolution scalable encoder 704. The encoder 704 outputs the high resolution compressed code-stream which is both input to the extractor 708 and to the transmitter 712. The extractor 708 extracts a low resolution compressed code-stream from the high resolution compressed code-stream, and inputs the same to a low resolution decoder 709 to produce a low resolution extracted image. The low resolution processing group 730 inputs the high resolution original image data to a downscaler 706 which downscales the high resolution original image data to a low resolution downscaled image. The subtractor 710 outputs the difference between the low resolution downscaled image and the low resolution extracted image from the high resolution processing group 720 to produce a low resolution enhancement layer. The low resolution enhancement layer is encoded 711 to produce a low resolution enhancement layer compressed code-stream, which is input to the transmitter 712 for transmission. It will be understood by those skilled in the art that implementation of the transmit/send step 712 may include, for example, storing the high resolution compressed code-stream and the enhancement layer compressed code-stream on a hard drive or other physical media and transporting it to another location.

As should be clear, the enhancement layer is generated by the combined action of both the high resolution processing group 720 and the low resolution processing group 730. Accordingly, the combination of the two groups 720 and 730 is referred to as an enhancement layer generator.

FIG. 8 shows a decoder side 800 according to an implementation. The data received from the encoder 700, which includes both the high resolution compressed code-stream and the low resolution enhancement layer compressed code stream, is received by a processor 802 or other processing device which may include a memory 803. The processor 802 directs the high resolution compressed code stream to the high resolution processing group 820 and directs the low resolution enhancement layer compressed code stream to the low resolution processing group 830. The high resolution processing group 820 inputs the high resolution compressed code stream to an extractor 804 to extract a low resolution compressed code stream. The low resolution compressed code stream output from the extractor 804 is low resolution decoded 806 to produce a low resolution extracted image. The low resolution processing group 830 directs the low resolution enhancement layer compressed code stream to an enhancement layer decoder 808. The decoded low resolution enhancement layer is added 810 to the low resolution extracted image (generated from the high resolution image data) to produce an enhanced low resolution image. The image could then be, for example, used for display on a display 812.

Analogous to the discussion of FIG. 7, it is clear that the enhanced image is generated by the combined action of both the high resolution processing group 820 and the low resolution processing group 830. Accordingly, the combination of the two groups 820 and 830 is referred to as an enhanced image generator.

The above implementation of FIGS. 2-3 and 7-8 illustrate a spatial-domain enhancement layer. In the spatial-domain implementation, the enhancement layer includes data determined by, for example, subtracting (110) two images (109, 105) from each other. The images are all in the spatial domain, and typically include pixel values.

Figure 3:
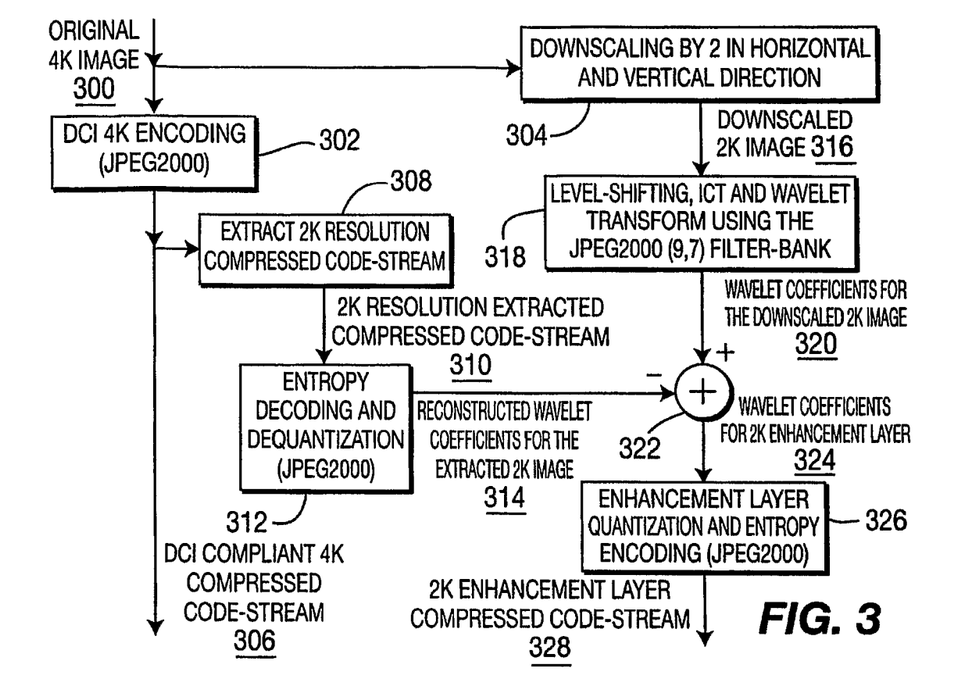
FIG. 3 is a flow diagram of a method for producing a 2K enhancement layer compressed code-stream.
Figure 4:
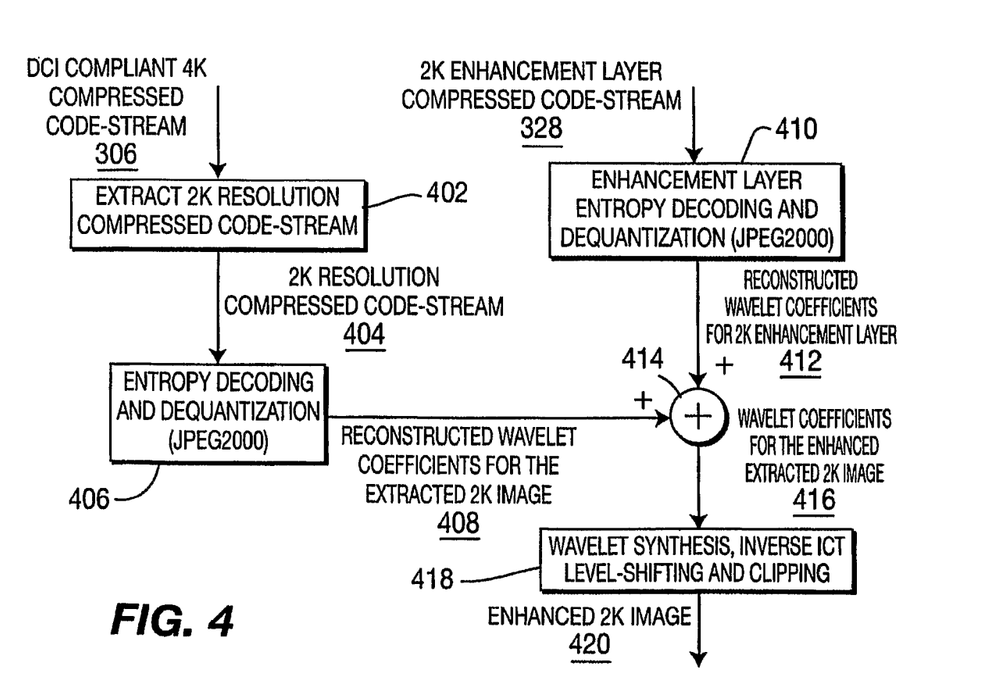
FIG. 4 is a flow diagram of a method for producing an enhanced 2K resolution image using the produced 2K enhancement layer compressed code-stream of FIG. 3.

In contrast, an implementation below, described in the context of FIGS. 3-4, illustrates a frequency-domain enhancement layer. In the frequency-domain implementation, the enhancement layer includes data determined by, for example, subtracting (322) two sets (314, 320) of wavelet coefficients from each other. The coefficients are part of frequency-domain representations of the underlying images.

Another implementation of the present principles is now discussed in the framework of DCI compliant 4K encoding. As mentioned earlier, in this scenario, the high resolution image is a 4K image and the low resolution image is a 2K image. A flowchart for producing a 2K enhancement layer compressed code-stream in accordance with an implementation is shown in FIG. 3. An original 4K image 300 is encoded 302 as per the DCI specification (JPEG2000) to produce a DCI compliant 4K compressed code-stream 306. A 2K resolution compressed code-stream 310 is extracted 308 from the DCI compliant 4K code-stream 306 by simple truncation. The 2K resolution extracted compressed code-stream 310 undergoes entropy decoding and dequantization 312 to produce reconstructed wavelet coefficients 314 for the extracted 2K image. Operation 312 does not include, in this implementation, inverse wavelet transformation because the wavelet coefficients, rather than for example the spatial-domain pixel data, are desired.

The original 4K image undergoes downscaling by a factor of 2 in the horizontal and vertical direction 304 to produce a downscaled 2K image 316. The downscaled 2K image 316 is DC level-shifted (318) to produce pixel values centered around zero; and then undergoes irreversible color transform (ICT) (318) as specified in the JPEG2000 standard, and wavelet transformation (318) with the JPEG2000 (9,7) filters to produce wavelet coefficients 320 for the downscaled 2K image. The ICT (318) is applied only if the DCI 4K encoding step (302) uses ICT. The number of decomposition levels for the wavelet transformation is one less than the decomposition levels used for the DCI 4K encoding.

The reconstructed wavelet coefficients 314 for the extracted 2K image are subtracted 322 from the wavelet coefficients 320 for the downscaled 2K image to produce wavelet coefficients 324 for the 2K enhancement layer. The wavelet coefficients 324 for the 2K enhancement layer are quantized and entropy encoded using JPEG2000 (326) to produce a 2K enhancement layer compressed code-stream 328. As before, the quantization level can be set to produce, at most, a fixed number of bytes, which can be user-specified.

FIG. 4 shows how a 2K enhancement layer compressed code-stream can be combined with a corresponding DCI-compliant 4K compressed code-stream to produce the enhanced 2K image. A 2K resolution compressed code-stream 404 is extracted 402 from a DCI-compliant 4K compressed code-stream 306. The 2K resolution compressed code-stream 404 undergoes entropy decoding and dequantization 406 in the JPEG2000 framework to produce reconstructed wavelet coefficients for the extracted 2K image 408. Similarly, a corresponding 2K enhancement layer compressed code-stream 328 undergoes entropy decoding and dequantization 410 in the JPEG2000 framework to produce reconstructed wavelet coefficients for the 2K enhancement layer 412. The reconstructed wavelet coefficients for the extracted 2K image 408 and for the 2K enhancement layer 412 are added 414 to produce the wavelet coefficients for the enhanced 2K image 416. The wavelet coefficients for the enhanced extracted 2K image 416 undergo wavelet synthesis and inverse ICT; and are then DC level-shifted and clipped 418 to the appropriate bit-depth to produce an enhanced 2K image 420. The inverse ICT is applied only if the DCI-compliant 4K compressed code-stream 306 was produced using ICT. The wavelet synthesis refers to a reverse wavelet transformation.

Figure 5:
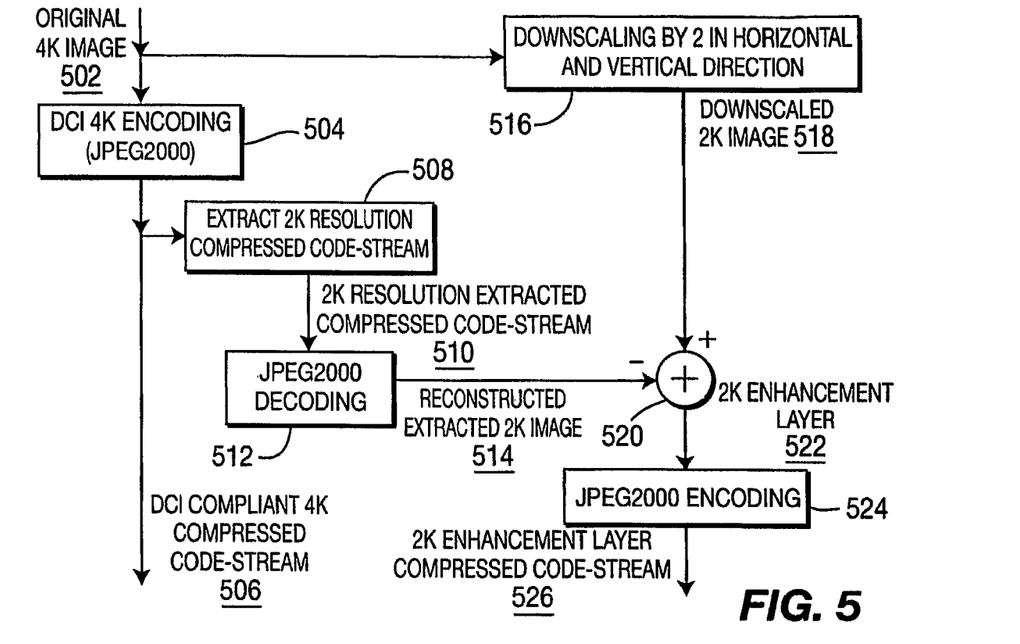
FIG. 5 is a flow diagram of another implementation of a method for producing a 2K enhancement layer compressed code-stream.
Figure 6:
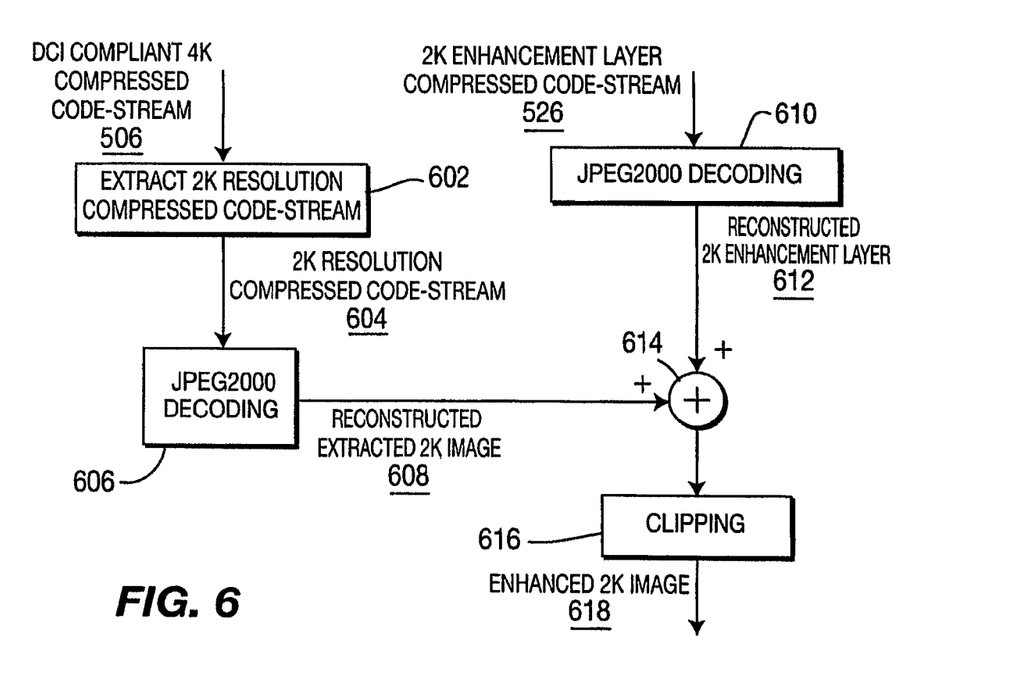
FIG. 6 is a flow diagram of another implementation of a method for producing an enhanced 2K resolution image using the produced 2K resolution enhancement layer compressed-code stream of FIG. 5.

FIGS. 5 and 6 show an alternative implementation for producing an enhanced 2k image from an original 4k image according to the present principles. The implementation of FIGS. 5 and 6 is also DCI-compliant, but works with images data (spatial domain) rather than wavelet coefficients (frequency domain) or other descriptors of the image data.

Referring to FIG. 5, an original 4K image 502 is DCI 4K encoded 504 as per the DCI specification to produce a DCI compliant 4K compressed code-stream 506. A 2K resolution compressed code-stream 510 is extracted 508 from the DCI compliant 4K code-stream by simple truncation. The 2K resolution extracted compressed code-stream 510 undergoes JPEG2000 decoding (including inverse wavelet transformation) 512 to produce a reconstructed extracted 2K image 514. Here JPEG2000 decoding includes entropy decoding, dequantization, inverse ICT (if needed), DC level-shifting, and clipping to the appropriate bit-depth. The original 4K image also undergoes downscaling by a factor of 2 in the horizontal and vertical direction (516) to produce a downscaled 2K image 518. The reconstructed extracted 2K image 514 is subtracted 520 from the downscaled 2K image 518 to produce a 2K enhancement layer 522. The 2K enhancement layer 522 is encoded 524 using JPEG2000 to produce a 2K enhancement layer compressed code-stream 526. As before, the quantization level can be set to produce at most a fixed number of bytes, which can be user-specified.

In FIG. 6 a 2K resolution compressed code-stream 604 is extracted from a DCI-compliant 4K compressed code-stream 506. The 2K resolution compressed code-stream 604 undergoes JPEG2000 decoding 606 to produce a reconstructed extracted 2K image 608. Similarly, a corresponding 2K enhancement layer compressed code-stream 526 undergoes JPEG2000 decoding 610 to produce a reconstructed 2K enhancement layer 612. The reconstructed extracted 2K image 608 and the reconstructed 2K enhancement layer 612 are added 614 and clipped 616 to the appropriate bit-depth, to produce an enhanced 2K image 618. The enhanced 2K image 618 is expected to correspond to the downscaled 2K image 518 if lossless encoding is used to encode 524 the 2K enhancement layer 522.

Figure 9:
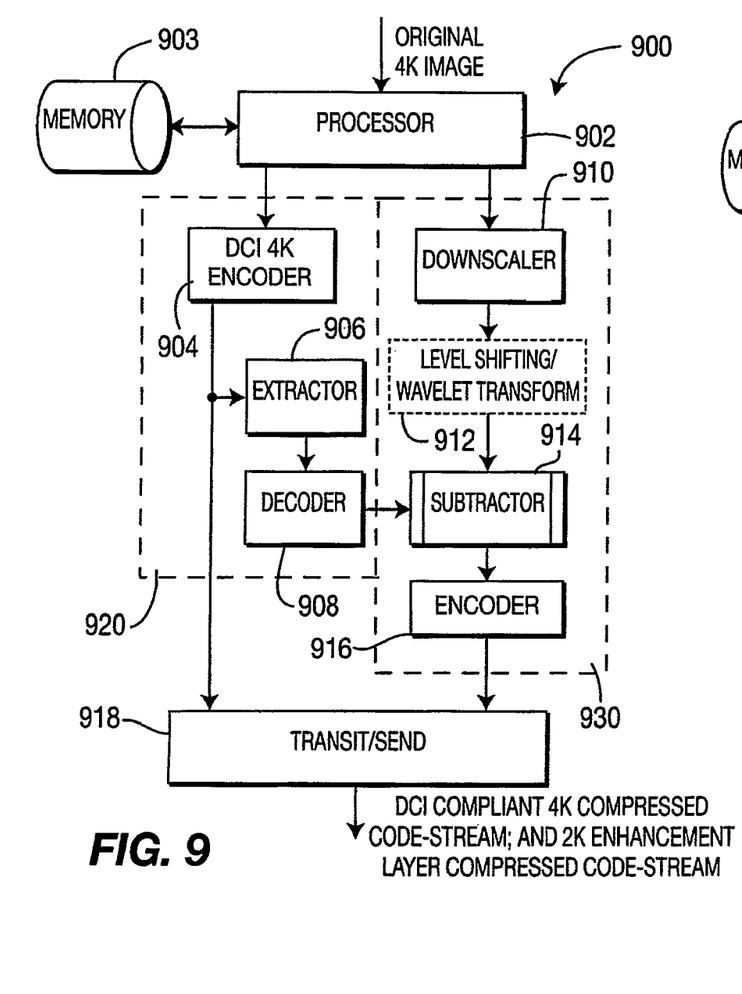
FIG. 9 is a block diagram of an encoder for producing a 2K enhancement layer compressed code-stream according to another implementation.
Figure 10:
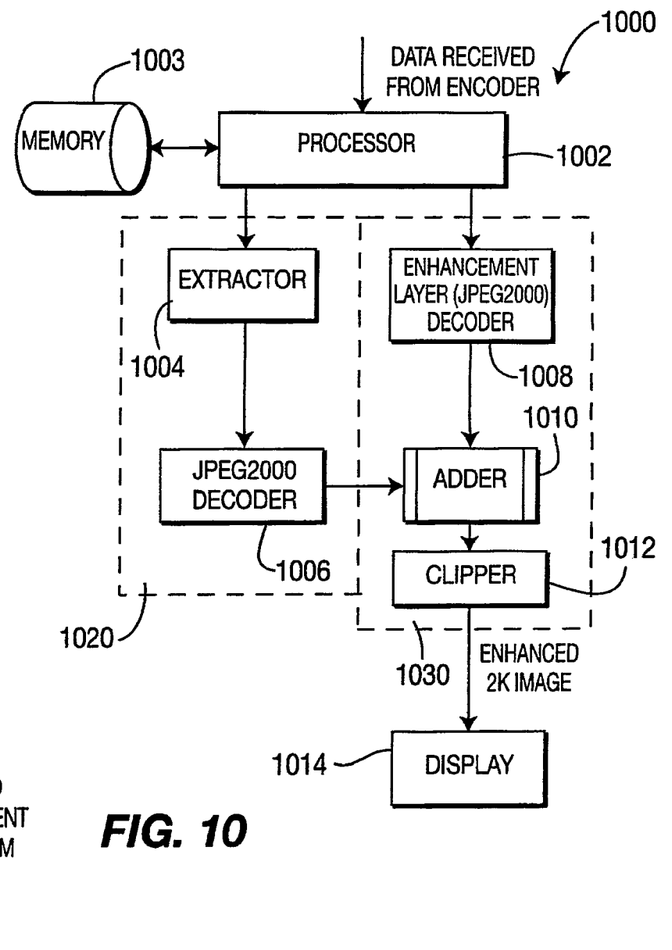
FIG. 10 is a block diagram of a decoder for producing an enhanced 2K resolution image according to another implementation.

FIG. 9 shows an implementation of an encoder 900 that can be used to implement the method of FIG. 3. Similarly, FIG. 10 shows an implementation of a decoder 1000 that can be used to implement the method of FIG. 4.

Referring to FIG. 9, the original 4k image is received by a processor 902 or other input device. The processor 902 is coupled to a memory 903 and is configured to input the original 4k image to a high resolution processing group 920 and a low resolution processing group 930. The high resolution processing group 920 receives the original 4K image and inputs it to a DCI 4K encoder 904. The DCI 4k encoder 904 produces a DCI compliant 4K compressed code stream, which is input to a transmitter 918 for transmission and is also input to an extractor 906 to extract a 2K resolution compressed code stream from the DCI compliant 4K compressed code stream. Once extracted, the 2K resolution compressed code stream is decoded 908 (entropy decoding and dequantization) to produce reconstructed wavelet coefficients for the extracted 2K image. The decoding in operation 908 may also be referred to as a partial decoding because the code stream is only decoded to the point of providing the wavelet coefficients and no inverse wavelet transformation is performed. Further, the operations of extraction (906) and decoding (908) can be generally referred to collectively as processing or even decoding.

The low resolution processing group 930 receives the original 4K image and downscales (910) the same to produce a downscaled 2K image. Wavelet coefficients for the downscaled 2K image are generated by level shifting and wavelet transformation (912). The difference between reconstructed wavelet coefficients for the extracted 2K image (generated by the high resolution processing group) and the wavelet coefficients for the downscaled 2K image is determined by a subtractor 914 to produce wavelet coefficients for the 2K enhancement layer. These wavelet coefficients are enhancement layer encoded (916) and sent to the transmitter 918 for transmission.

The transmit/send unit 918 may combine the encoded enhancement layer (916) and the DCI compliant 4K compressed code stream (904) into a single transmission or storage unit. For example, as discussed below with respect to FIGS. 11 and 13, unit 918 may form a DC package that includes that includes the compressed code-stream and at least one of (1) the enhancement-layer compressed code-stream or (2) a pointer to the enhancement-layer compressed code-stream. Accordingly, unit 918 may be referred to as a "combiner".

Analogous to the discussion of FIG. 7, it is clear that the enhancement layer is generated by the combined action of both the high resolution processing group 920 and the low resolution processing group 930. Accordingly, the combination of the two groups 920 and 930 is referred to as an enhancement layer generator.

FIG. 10 shows a decoder 1000 according to an implementation. The decoder 1000 includes a processor 1002 and memory 1003 where the processor is configured to receive the data from an encoder. The data received from the encoder includes the DCI compliant 4K compressed code-stream and the 2K resolution enhancement layer compressed code-stream. The processor 1002 sends the 4K resolution compressed code-stream to a high resolution processing group 1020 and the 2K resolution enhancement layer compressed code-stream to a low resolution processing group 1030. The extractor 1004 extracts the 2K resolution compressed code-stream from the 4K resolution image data and the decoder (e.g., JPEG2000 decoder) 1006 decodes the extracted 2K resolution compressed code-stream to produce reconstructed wavelet coefficients for the extracted 2K resolution image.

The low resolution processing group 1030 includes an enhancement layer decoder 1008 that is configured to receive the 2K resolution enhancement layer compressed code stream, and to produce reconstructed wavelet coefficients for the 2K resolution enhancement layer. The reconstructed wavelet coefficients for the extracted 2K resolution image (generated by the high resolution processing group) are then added (1010) with the reconstructed wavelet coefficients for the 2K resolution enhancement layer (generated by the low resolution processing group) to produce wavelet coefficients for the enhanced extracted low resolution image. These wavelet coefficients are then synthesized, undergo inverse ICT, and are then level shifted and clipped (1012) to produce the enhanced 2K resolution image. The inverse ICT step is performed only if the DCI compliant 4K compressed code-stream is generated using ICT. As before, these images may be displayed on a display 1014.

Analogous to the discussion of FIG. 8, it is clear that the enhanced image is generated by the combined action of both the high resolution processing group 1020 and the low resolution processing group 1030. Accordingly, the combination of the two groups 1020 and 1030 is referred to as an enhanced image generator.

FIGS. 9 and 10 may be adapted to implement the methods of FIGS. 5 and 6. One of ordinary skill will readily understand how to make such modifications, particularly in light of the disclosure and discussion of FIGS. 7 and 8.

Apart from the restriction on the wavelet decomposition levels in the case of the implementation of FIGS. 3 and 4, most other parameters for encoding the 2K enhancement layer can be chosen freely. The bit-depth for the 2K enhancement layer should be chosen so as to avoid unnecessary clipping. In the DCI framework, the 4K and 2K images are 12-bit. Then in FIG. 5, the 2K enhancement layer has to be encoded as a signed 13-bit image. If the subtraction is going to take place in the wavelet domain, as shown in FIG. 3, then the analysis of the bit-depth needed may be more complex. Suppose that both the analysis filters (low pass and high pass) are implemented with (1,1) normalization as described by Taubman and Marcellin ("JPEG2000 image compression fundamentals, standards and practice" Kluwer Academic Publishers, ISBN 0-7923-7519-x, 2002). Then, if the bit-depth of the original 4K image is N, (N+1) bits are sufficient to represent each subband without any clipping. Assuming, the downscaled 2K image also has a bit-depth of N, its wavelet coefficients can be represented by (N+1) bits. Thus, the wavelet coefficients for the 2K enhancement layer, which are calculated as a difference, can be represented by (N+2) bits. Thus, for JPEG2000 encoding purposes, it can be assumed that the wavelet coefficients of the enhancement layer have been generated by wavelet decomposition of a (N+1) bit signed image.

Those skilled in the art will recognize that in FIG. 5, the 2k enhancement layer may be compressed using any other compression method instead of JPEG2000 encoding. Similarly, in FIG. 3, the wavelet coefficients for the 2K enhancement layer may be compressed using any other compression method instead of JPEG2000 encoding. Furthermore, JPEG2000 encoding techniques can be used for compressing the 2K enhancement layer without producing a JPEG2000 compliant code-stream. This is accomplished, for example, by forcing the 2K enhancement layer encoding engine to use the equivalent parameters as the 4K JPEG2000 encoding engine. In that case, it is not necessary to store a number of marker segments. But the resulting gain in compression efficiency is typically small.

A DC composition is defined as an ordered sequence of reels. Each reel can contain multiple media track files to be reproduced in parallel during the presentation. A reel can have a single main picture, main sound, and main subtitle track files. However, the current standard specification also supports additional track files for future uses. A DC composition can be put into one or more DC packages for distribution to theaters or other venues.

Figure 11:
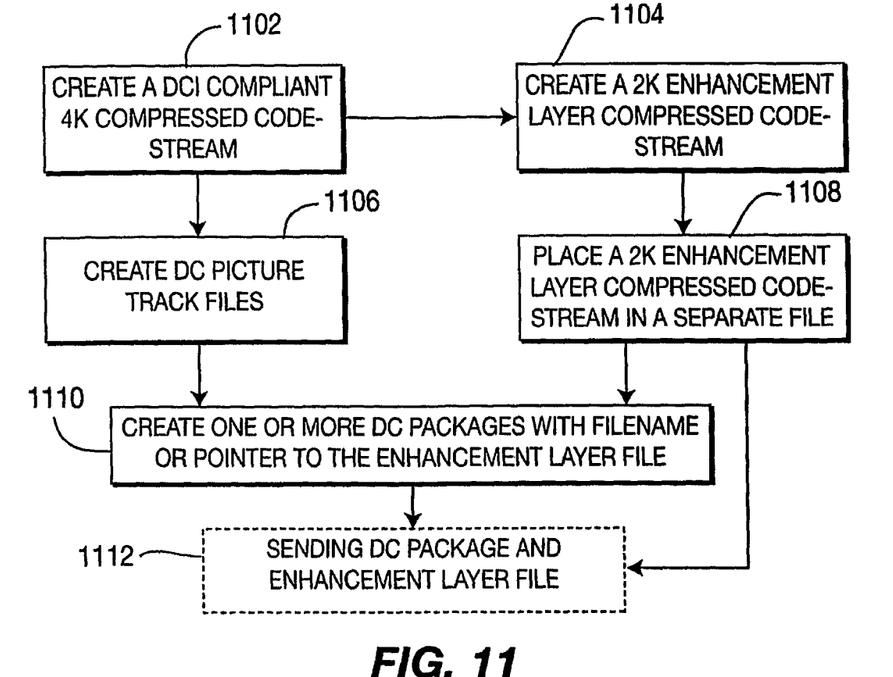
FIG. 11 is a flow diagram of an encoding method for producing an enhanced low resolution image according to an implementation.
Figure 12:
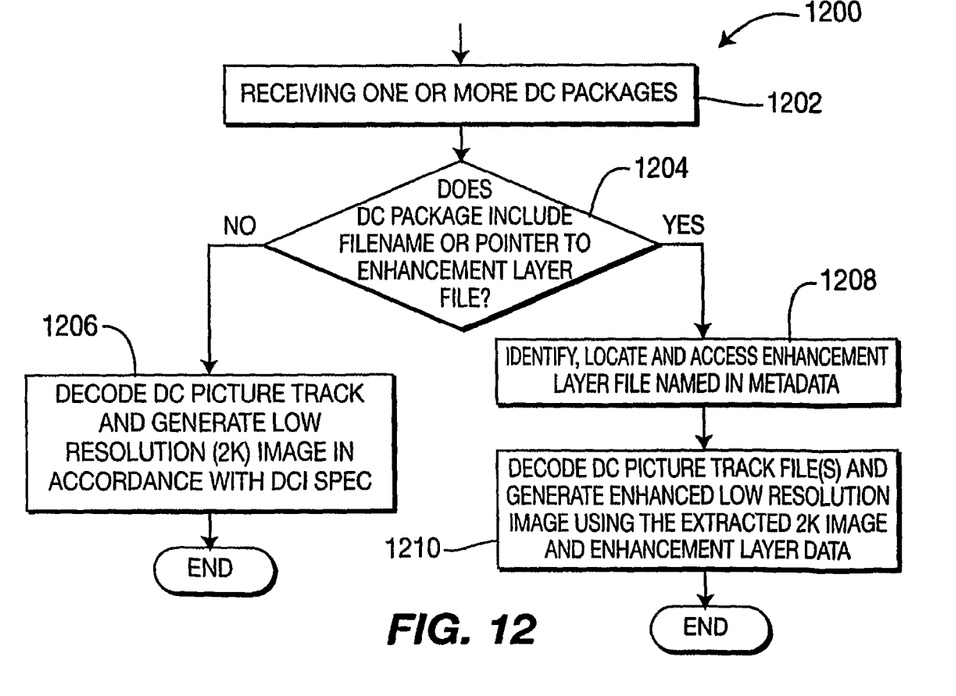
FIG. 12 is a flow diagram of a decoding method for producing an enhanced low resolution image according to an implementation.

In accordance with another implementation, the low resolution enhancement can be performed by maintaining the enhancement data separate from the DCP Stream. FIGS. 11 and 12 show an exemplary implementation of this concept from the transmitter (i.e., creation) and receiving (i.e., playback) sides, respectively.

Referring to FIG. 11, a DCI compliant 4K compressed code-stream 1102 is used to create DC picture track files 1106 and to create the 2K enhancement layer compressed code stream 1104. Once completed, the 2K enhancement layer compressed code stream 1104 is placed in a separate file 1108. One or more DC packages are created 1110 using the previously created DC picture track files and which include the filename or a pointer to the enhancement layer file. Note that "pointer" is a broad term that includes, for example, an address, a name (e.g. a filename), or other descriptor that indicates where the enhancement layer file is located. In one implementation, the filename, or pointer, is included in a metadata field that the standard defines. The metadata field may be, for example, a free-form text field, effectively allowing an implementation to use the field for a variety of purposes.

At this stage, the one or more DC packages and the enhancement layer file can be sent 1112 (either manually via mail or electronically via communication network of any suitable type). Those skilled in the art will also recognize that the enhancement layer file can be transmitted completely separate from the DC package information. The creation of the DCI compliant 4K compressed code stream and the 2K enhancement layer compressed code-stream may be, for example, as described above.

FIG. 12 shows the method 1200 for receiving and processing the enhancement file data in accordance with an implementation. As shown, one or more DC packages are received 1202. A determination 1204 is then made as to whether the DC packages include a filename or other pointer to an enhancement layer file. If there is no enhancement layer filename or pointer, the DC picture track is decoded and the low resolution (2K) image is generated in accordance with the DCI spec 1206. If there is an enhancement filename or pointer contained within the DC package information, the enhancement layer file named in the metadata is identified, located, and accessed 1208. Once identified and accessed, the DC picture track file(s) is decoded and the enhanced low resolution (2K) image is generated 1210 using the enhancement layer file data.

On the receiving end of such transmissions, for example, movie theaters or other playback locations that are not aware of the enhancement layer data would playback the extracted 2K version directly from the DC picture track file(s). Playback systems that are aware of the enhancement layer data would produce the enhanced 2K version from the DC main picture track file(s) and the enhancement layer picture track file(s). Thus, this implementation is backward compatible with legacy and other existing systems that implement the DCI specification. Such systems will typically ignore a field that is not expected to have data, or if the system does not know what to do with data in such a field.

Figure 13:
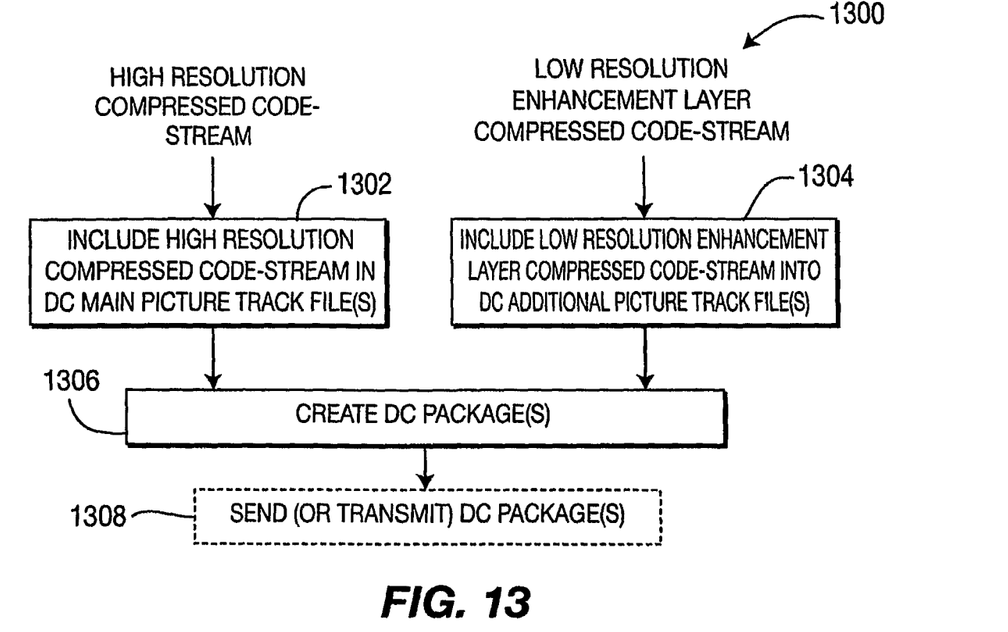
FIG. 13 is a flow diagram of a DCP-Specification-compliant method for producing an enhanced 2K resolution image.
Figure 14:
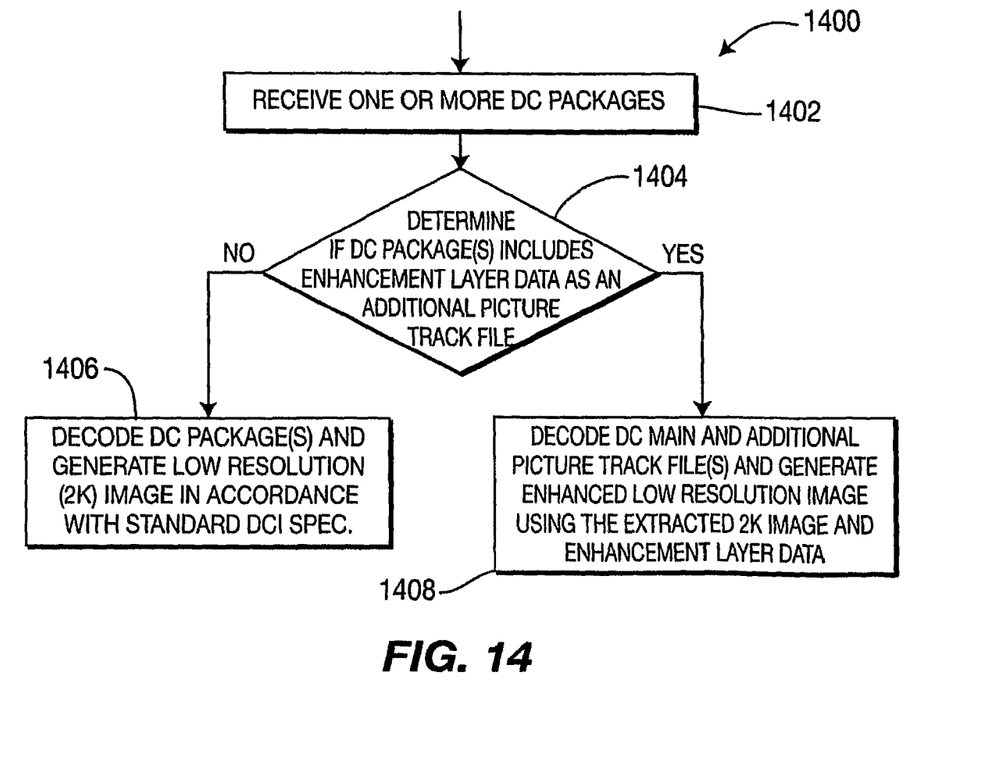
FIG. 14 is a flow diagram of a DCP-Specification-compliant method for producing an enhanced 2K resolution image.

FIGS. 13 and 14 show a representative implementation of a DCP Specification compliant implementation of the present principles. The method 1300 of FIG. 13 shows that both the high resolution compressed code-stream and the low resolution enhancement layer compressed code-stream are combined such that the low resolution enhancement layer compressed code-stream is included in the created DC packages. That is, the low resolution enhancement layer compressed code-stream is included in an additional picture track within the DC packages. The high resolution compressed code-stream is included in the DC main picture track (1302) and the low resolution enhancement layer compressed code-stream is included into DC additional picture track file(s) (1304). Once included, the DC package(s) are created 1306. The created DC packages can then be sent (i.e., manually in reels or other storage media) or transmitted electronically 1308 to the respective receivers (e.g., movie theaters) of the image data.

FIG. 14 shows the receiving end 1400 of the DC package data. The DC package data is received 1402, and a determination is then made (1404) as to whether the DC package data includes the low resolution enhancement layer data as an additional picture track file. If it does, the DC main and additional picture tracks are decoded (1408) and the enhanced low resolution image is generated using the extracted 2K image and the enhancement layer data contained in the DC main and additional picture track file (1408). If there is no enhancement layer data contained as an additional picture track in the DC package(s), the DC package(s) are decoded (1406) and the low resolution (2K) image is generated in accordance with standard DCI Specification requirements. Thus, as in the earlier discussion of FIGS. 11-12, if a system is not aware of the additional picture track file (or is aware, but does not know what to do with the additional picture track file), then the system typically ignores the additional picture track file.

Note that the above implementations may be combined in various ways. For example, a system may include an additional picture track file (in a DC package) for a first enhancement layer, as well as a pointer to a second enhancement layer. As another example, a system may include in any given DC package only one of an additional picture track file or a pointer, but the system may allow a user to choose either mechanism for each DC package. Such a choice may be made, for example, in real time based on the size of the enhancement layer for the given DC package. Alternatively, a system could make the choice without user-intervention by, for example, consulting a look-up table that indicates the preferred mechanism for a given movie or a given intended-recipient of the DC package.

Implementations have different levels of computational complexity. For example, the implementations of FIGS. 4 and 6 may be compared. FIG. 4 describes a decoder that requires at least one inverse wavelet transformation (unit 418), and FIG. 6 describes a decoder that requires at least two inverse wavelet transformations (units 606 and 610).

Features and aspects of described implementations may be applied to various applications. Applications include, for example, a pre-processor or an encoder for creating DC packages or other data packages, or a decoder or other video receiving/processing apparatus, such as described above. Of course, various units may be integrated, such as, for example, a pre-processor and an encoder. The features and aspects herein described may, however, be adapted for other application areas.

The implementations described herein may be implemented in, for example, a method or process, an apparatus, or a software program. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example; a processor, which refers to processing devices in general, including, for example, a computer, a microprocessor, an integrated circuit, or a programmable logic device.

Implementations of the various processes and features described herein may be embodied in a variety of different equipment or applications, particularly, for example, equipment or applications associated with video transmission. Examples of equipment include video coders, video decoders, video codecs, web servers, and personal computers. As should be clear from these examples, encodings may be sent or received over a variety of paths, including, for example, wireless or wired paths, the Internet, cable television lines, telephone lines, and Ethernet connections. Additionally, as should be clear, the equipment may be mobile and even installed in a mobile vehicle.

Additionally, the methods may be implemented by instructions being performed by a processor, and such instructions may be stored on a processor readable medium such as, for example, an integrated circuit, a software carrier, or other storage device such as, for example, a hard disk, a compact diskette, a random access memory ("RAM"), or a read-only memory ("ROM"). A processor may also include a processor readable medium having, for example, instructions for carrying out a process.

As should be evident to one of skill in the art, implementations may also produce a signal formatted to carry information that may be, for example, stored or transmitted. The signal may be transmitted as, for example, an electromagnetic wave, and may carry information by, for example, modulating one or more carrier frequencies. The information may include, for example, instructions for performing a method, or data produced by one of the described implementations.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the following claims.

The invention claimed is:

1. A method comprising:
   encoding a digital image into an encoded image that comprises a compressed code-stream for the digital image, the compressed code-stream being such that a higher-resolution compressed bitstream and a lower-resolution compressed bitstream can both be extracted from the compressed code-stream before decompressing the compressed code-stream, and the higher-resolution compressed bitstream can be decoded to produce a higher resolution decoding of the digital image, and the lower-resolution compressed bitstream can be decoded to produce a specific lower resolution decoding of the digital image;

downscaling the digital image to produce a downscaled lower resolution image different from the specific lower resolution decoding of the digital image;

determining a difference between the downscaled lower resolution image and the specific lower resolution decoding of the digital image; and encoding the difference to allow a reconstruction of the downscaled lower resolution image based on the specific lower resolution decoding of the digital image and the difference.

2. The method of claim 1, wherein the difference comprises spatial-domain data.

3. The method of claim 1, wherein the difference comprises frequency-domain data.

4. The method of claim 1, wherein said encoding is performed according to DCI Specification.

5. An apparatus comprising:

an encoder to encode a digital image into an encoded image that comprises a compressed code-stream for the digital image, the compressed code-stream being such that a higher-resolution compressed bitstream and a lower-resolution compressed bitstream can both be extracted from the compressed code-stream before decompressing the compressed code-stream, and the higher-resolution compressed bitstream can be decoded to produce a higher resolution decoding of the digital image, and the lower-resolution compressed bitstream can be decoded to produce a specific lower resolution decoding of the digital image;

a downscaler to downscale the digital image to produce a downscaled lower resolution image different from the specific lower resolution decoding of the digital image;

a combiner to determine a difference between the downscaled lower resolution image and the specific lower resolution decoding of the digital image; and a second encoder to encode the difference to allow a reconstruction of the downscaled lower resolution image based on the specific lower resolution decoding of the digital image and the difference.

6. An apparatus comprising:

means for encoding a digital image into an encoded image that comprises a compressed code-stream for the digital image, the compressed code-stream being such that a higher-resolution compressed bitstream and a lower-resolution compressed bitstream can both be extracted from the compressed code-stream before decompressing the compressed code-stream, and the higher-resolution compressed bitstream can be decoded to produce a higher resolution decoding of the digital image, and the lower-resolution compressed bitstream can be decoded to produce a specific lower resolution decoding of the digital image;

means for downscaling the digital image to produce a downscaled lower resolution image different from the specific lower resolution decoding of the digital image;

means for determining a difference between the downscaled lower resolution image and the specific lower resolution decoding of the digital image; and means for encoding the difference to allow a reconstruction of the downscaled lower resolution image based on the specific lower resolution decoding of the digital image and the difference.

7. A program storage device having an application program tangibly embodied thereon, the application program including instructions for performing at least the following:

encoding a digital image into an encoded image that comprises a compressed code-stream for the digital image, the compressed code-stream being such that a higher-resolution compressed bitstream and a lower-resolution compressed bitstream can both be extracted from the compressed code-stream before decompressing the compressed code-stream, and the higher-resolution compressed bitstream can be decoded to produce a higher resolution decoding of the digital image, and the lower-resolution compressed bitstream can be decoded to produce a specific lower resolution decoding of the digital image;

downscaling the digital image to produce a downscaled lower resolution image different from the specific lower resolution decoding of the digital image;

determining a difference between the downscaled lower resolution image and the specific lower resolution decoding of the digital image; and encoding the difference to allow a reconstruction of the downscaled lower resolution image based on the specific lower resolution decoding of the digital image and the difference.

8. A method comprising:

accessing encoded image data that comprises a compressed code-stream for a digital image, the compressed code-stream being such that a higher-resolution compressed bitstream and a lower-resolution compressed bitstream can both be extracted from the compressed code-stream before decompressing the compressed code-stream, and the higher-resolution compressed bitstream can be decoded to produce a higher resolution decoding of the digital image, and the lower-resolution compressed bitstream can be decoded to produce a specific lower resolution decoding of the digital image;

extracting the lower-resolution compressed bitstream from the compressed code-stream;

decoding the extracted lower-resolution compressed bitstream to produce the specific lower resolution decoding of the digital image;

decoding encoded difference information indicating a difference between the specific lower resolution decoding of the digital image and a different downscaled lower resolution version of the digital image, wherein the different downscaled lower resolution version is different from the specific lower resolution decoding of the digital image; and combining the specific lower resolution decoding of the digital image and the decoded difference information to provide a reconstruction of the different downscaled lower resolution version of the digital image.

9. The method of claim 8, further comprising receiving a pointer to the encoded difference information in metadata contained in a digital cinema package received with the encoded image data.

10. The method of claim 8, wherein combining the specific lower resolution decoding of the digital image and the decoded difference information comprises adding wavelet coefficients for the specific lower resolution decoding of the digital image with the decoded difference information to produce enhanced wavelet coefficients for the reconstruction of the different downscaled lower resolution version of the digital image.

11. An apparatus comprising:
a processor configured to receive encoded image data that comprises a compressed code-stream for a digital image, the compressed code-stream being such that a higher-resolution compressed bitstream and a lower-resolution compressed bitstream can both be extracted from the compressed code-stream before decompressing the compressed code-stream, and the higher-resolution compressed bitstream can be decoded to produce a higher resolution decoding of the digital image, and the lower-resolution compressed bitstream can be decoded to produce a specific lower resolution decoding of the digital image;
an extractor configured to extract the lower-resolution compressed bitstream from the compressed code-stream;
a decoder configured to decode the extracted lower-resolution compressed bitstream to produce the specific lower resolution decoding of the digital image;
an enhancement layer decoder configured to decode encoded difference information indicating a difference between the specific lower resolution decoding of the digital image and a different downscaled lower resolution version of the digital image, wherein the different downscaled lower resolution version is different from the specific lower resolution decoding of the digital image; and
a combiner configured to combine the specific lower resolution decoding of the digital image and the decoded difference information to provide a reconstruction of the different downscaled lower resolution version of the digital image.

12. An apparatus comprising:
means for accessing encoded image data that comprises a compressed code-stream for a digital image, the compressed code-stream being such that a higher-resolution compressed bitstream and a lower-resolution compressed bitstream can both be extracted from the compressed code-stream before decompressing the compressed code-stream, and the higher-resolution compressed bitstream can be decoded to produce a higher resolution decoding of the digital image, and the lower-resolution compressed bitstream can be decoded to produce a specific lower resolution decoding of the digital image;
means for extracting the lower-resolution compressed bitstream from the compressed code-stream;
means for decoding the extracted lower-resolution compressed bitstream to produce the specific lower resolution decoding of the digital image;
means for decoding encoded difference information indicating a difference between the specific lower resolution decoding of the digital image and a different downscaled lower resolution version of the digital image, wherein the different downscaled lower resolution version is different from the specific lower resolution decoding of the digital image; and
means for combining the specific lower resolution decoding of the digital image and the decoded difference information to provide a reconstruction of the different downscaled lower resolution version of the digital image.

13. A program storage device having an application program tangibly embodied thereon, the application program including instructions for performing at least the following:
accessing encoded image data that comprises a compressed code-stream for a digital image, the compressed code-stream being such that a higher-resolution compressed bitstream and a lower-resolution compressed bitstream can both be extracted from the compressed code-stream before decompressing the compressed code-stream, and the higher-resolution compressed bitstream can be decoded to produce a higher resolution decoding of the digital image, and the lower-resolution compressed bitstream can be decoded to produce a specific lower resolution decoding of the digital image;
extracting the lower-resolution compressed bitstream from the compressed code-stream;
decoding the extracted lower-resolution compressed bitstream to produce the specific lower resolution decoding of the digital image;
decoding encoded difference information indicating a difference between the specific lower resolution decoding of the digital image and a different downscaled lower resolution version of the digital image, wherein the different downscaled lower resolution version is different from the specific lower resolution decoding of the digital image; and
combining the specific lower resolution decoding of the digital image and the decoded difference information to provide a reconstruction of the different downscaled lower resolution version of the digital image.

14. The method of claim 1 further comprising:
forming a data package that includes the compressed code-stream and at least one of (1) the encoded difference or (2) a pointer to the encoded difference; and
sending the data package for receipt by a device configured to extract the lower-resolution compressed bitstream, and to enhance the image corresponding to the lower-resolution compressed bitstream by using the enhancement-layer compressed code-stream.

15. The method of claim 14 wherein forming the data package comprises:
forming a DC picture track file for the compressed code-stream; and
including the DC picture track file in the data package.

16. The method of claim 14 wherein forming the data package comprises:
forming a DC picture track file for the encoded difference; and
including the DC picture track file in the data package.

17. The method of claim 14 wherein:
forming the data package comprises inserting the pointer into a metadata field of the data package, and
the method further comprises sending the encoded difference, for receipt by the device, in a file that is separate from the data package.

18. The method of claim 1 further comprising creating an enhancement-layer compressed code-stream that includes the encoded difference.

19. The method of claim 3, wherein the frequency-domain data comprises a difference between wavelet coefficients for the downscaled lower resolution image and wavelet coefficients for the specific lower resolution decoding of the digital image.

20. The method of claim 8, further comprising receiving a data package that includes a DC picture track file for the compressed code-stream for the digital image and that includes at least one of (1) the encoded difference information or (2) a pointer to the encoded difference information.

* * * * *